United States Patent
Pinckney et al.

(10) Patent No.: US 7,133,517 B2
(45) Date of Patent: Nov. 7, 2006

(54) INTERFACE TO INTEGRATED SWITCH CONTROL SOFTWARE

(75) Inventors: Bob Pinckney, Houston, TX (US); Richard Miller, Houston, TX (US)

(73) Assignee: Network Telco, Inc., Houston, TX (US)

( * ) Notice: Subject to any disclaimer, the term of this patent is extended or adjusted under 35 U.S.C. 154(b) by 797 days.

(21) Appl. No.: 10/162,422

(22) Filed: Jun. 4, 2002

(65) Prior Publication Data

US 2003/0063734 A1    Apr. 3, 2003

Related U.S. Application Data

(60) Provisional application No. 60/295,770, filed on Jun. 4, 2001.

(51) Int. Cl.
*H04M 7/00*    (2006.01)
*G06F 15/163*    (2006.01)

(52) U.S. Cl. ........................ 379/219; 719/311

(58) Field of Classification Search ............... 379/242, 379/219, 220.01, 265.02–265.04, 265.09; 370/352, 355; 719/311–313
See application file for complete search history.

(56) References Cited

U.S. PATENT DOCUMENTS

| | | | | |
|---|---|---|---|---|
| 6,091,808 | A | 7/2000 | Wood et al. | 379/201 |
| 6,188,683 | B1 * | 2/2001 | Lang et al. | 370/352 |
| 6,611,591 | B1 * | 8/2003 | McNiff et al. | 379/268 |
| 6,707,899 | B1 * | 3/2004 | Saito et al. | 379/202.01 |

* cited by examiner

*Primary Examiner*—Benny Q. Tieu
(74) *Attorney, Agent, or Firm*—Osha Liang LLP

(57) ABSTRACT

An interface to integrated switch control software includes a front-end interface coupled to a network; a back-end interface coupled to the integrated switch control software; and an interface control component that manages implementing requests from the network with the integrated switch control software. A method of interfacing to integrated switch control software includes coupling a front-end interface to a network; coupling a back-end interface to integrated switch control software; and managing the implementation of requests from the network with the integrated switch control software.

32 Claims, 21 Drawing Sheets

INTERFACE TO INTEGRATED SWITCH CONTROL SOFTWARE

CROSS-REFERENCE TO RELATED APPLICATIONS

This application claims priority under Section 119 of U.S. Provisional Application No. 60/295,770 filed on Jun. 4, 2001.

BACKGROUND OF INVENTION

FIG. 1 shows a typical telecommunication system. The central office (CO) (12) provides telecommunication services to subscribers (14) and (16). Each CO in the network (10) provides service to subscribers in a small geographic region. Thus, CO (12) provides services to its local subscribers (14) and (16) and CO (13) provides services to its local subscribers (15) and (17). Each subscriber in the entire network (worldwide) is given a unique identification number, e.g., a telephone number, IP address, etc. The fundamental operation of any CO is to physically connect subscribers to the network (10). This is accomplished via a hardware device known as a switch. Generally speaking, a switch is a network device that directs a signal through a network. Various network platforms and transport architectures are known in the art. Examples include basic circuit switched telephony, voice over "X" (wherein X may be DSL (digital subscriber line), FTTH (fiber-to-the-home), HFC (hybrid fiber coaxial line), IP (internet protocol), frame relay, asynchronous transfer mode, etc.), and wireless switching.

Referring to FIG. 2, a typical CO contains, among other things, a switch (20), a billing module (22), an operation system support module (24), and a customer service module (26). The switch (20) is a hardware component that connects a subscriber to the network or another subscriber. A billing module (22) is used to bill the subscriber for basic service rates, optional features, and usage. Most telephone billing systems contain a rater, which evaluates the applicable billing rates for usage of different carriers at different times of the day in order to choose the most cost effective route, or at least properly bill a subscriber. The operation system support module (24) is often used to keep track of inventory, assets, circuit ID, network designation, and orders. The customer service module (26) is usually used by a customer service representative to maintain subscriber information, change optional services, long distance carriers, reconcile billing errors, etc.

Each of the above systems are typically provided by separate vendors and rely on proprietary internal architectures. Because of this, upon receiving a request for new service or change in service from a subscriber, the changes need to be entered separately into the customer account for the subscriber in the customer service module (26), the subscriber options in the operation system support module (24), and customer profile in the billing module (22), and finally, the switch (20) must be programmed to allow the subscriber to access the new service(s).

In recent years, telecommunication service providers have added many enhanced telephone services such as Caller ID, 3-Way Calling, Call Forwarding, Call Waiting, Last Number Redial, Call Rejection, etc. Telephone service providers also offer other special features for telephone subscribers such as least cost routing, specialized billing, and blocks of telephone numbers. Together with the enhancement of services offered by telecommunication companies and at least in part due to the enhancement of services, switches have been designed to incorporate more robust control software. Likewise, with the ever-growing popularity of the Internet, telecommunication service providers have enhanced and increased availability of data services, e.g., dial-up and full-time connections to the Internet from the home or office.

SUMMARY OF INVENTION

In general, in one aspect, the present invention involves an interface to integrated switch control software comprising a front-end interface coupled to a network; a back-end interface coupled to the integrated switch control software; and an interface control component that manages implementing requests from the network with the integrated switch control software.

In general, in one aspect, the present invention involves a system for interfacing to integrated switch control software comprising an integrated switch comprising integrated switch control software; and a control interface coupled to the integrated switch for providing access from a network to the integrated switch control software.

In general, in one aspect, the present invention involves a method of interfacing to integrated switch control software comprising coupling a front-end interface to a network; coupling a back-end interface to integrated switch control software; and managing the implementation of requests from the network with the integrated switch control software.

In general, in one aspect, the present invention involves an apparatus for interfacing to integrated switch control software comprising means for coupling a front-end interface to a network; means for coupling a back-end interface to integrated switch control software; and means for managing the implementation of requests from the network with the integrated switch control software.

In general, in one aspect, the present invention involves a telecommunications central office comprising an integrated switch comprising integrated switch control software; a network interface for coupling to a network; and an interface control component connecting the integrated switch and the network interface to allow requests from the network to be implemented with the integrated switch control software.

In general, in one aspect, the present invention involves a telecommunications central office comprising a switch; a billing module; an operation system support module; a customer service module; control software for managing the switch, the billing module, the operation system support module, and the customer service module; a network interface for coupling to a network; and an interface control component comprising a front-end interface for coupling to the network interface; and a back-end interface for coupling to the control software. The interface control component allows requests from the network to be implemented with the control software.

Other aspects and advantages of the invention will be apparent from the following description and the appended claims.

DETAILED DESCRIPTION

Figure 1:
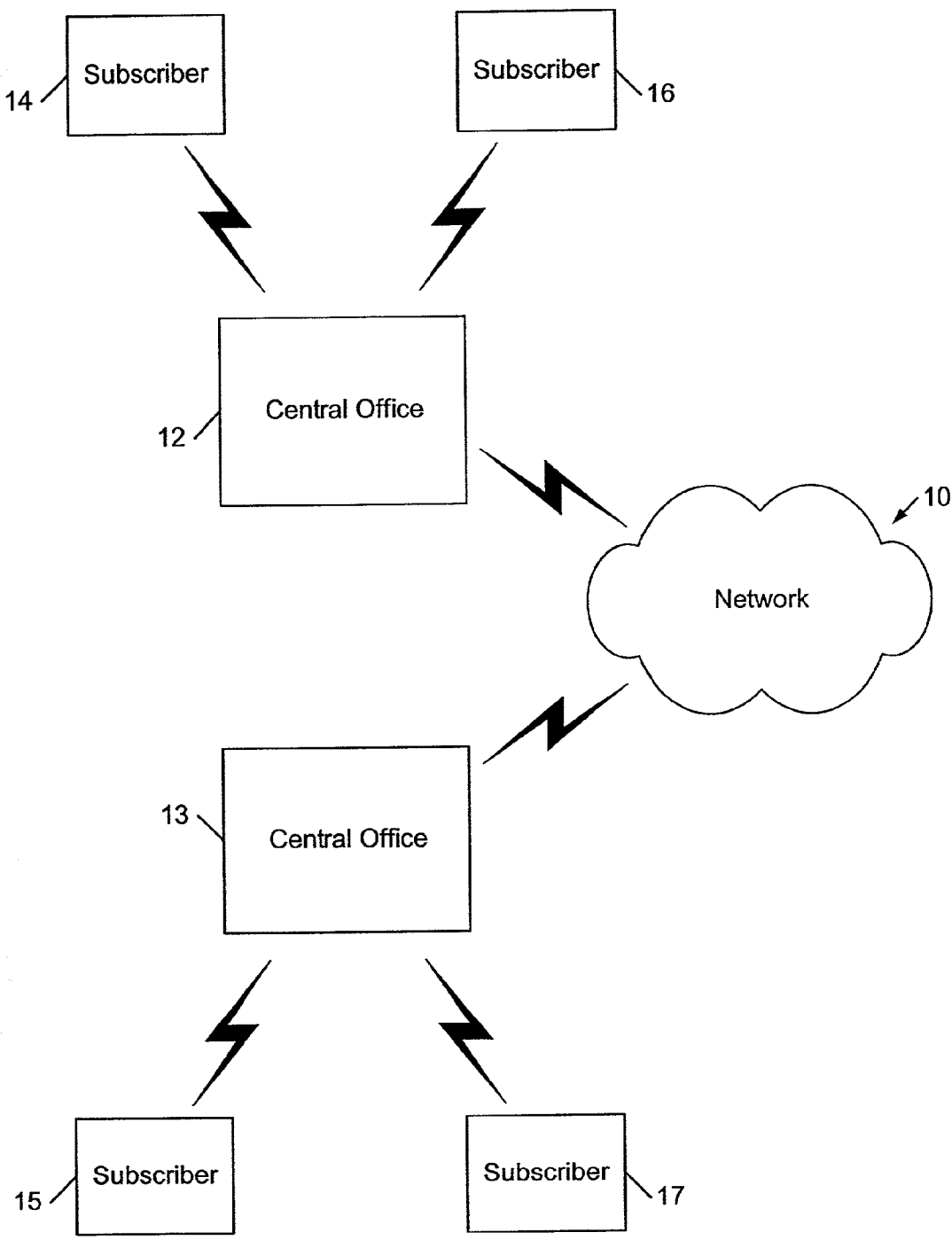
FIG. 1 is a diagram of a typical telecommunication system.
Figure 2:
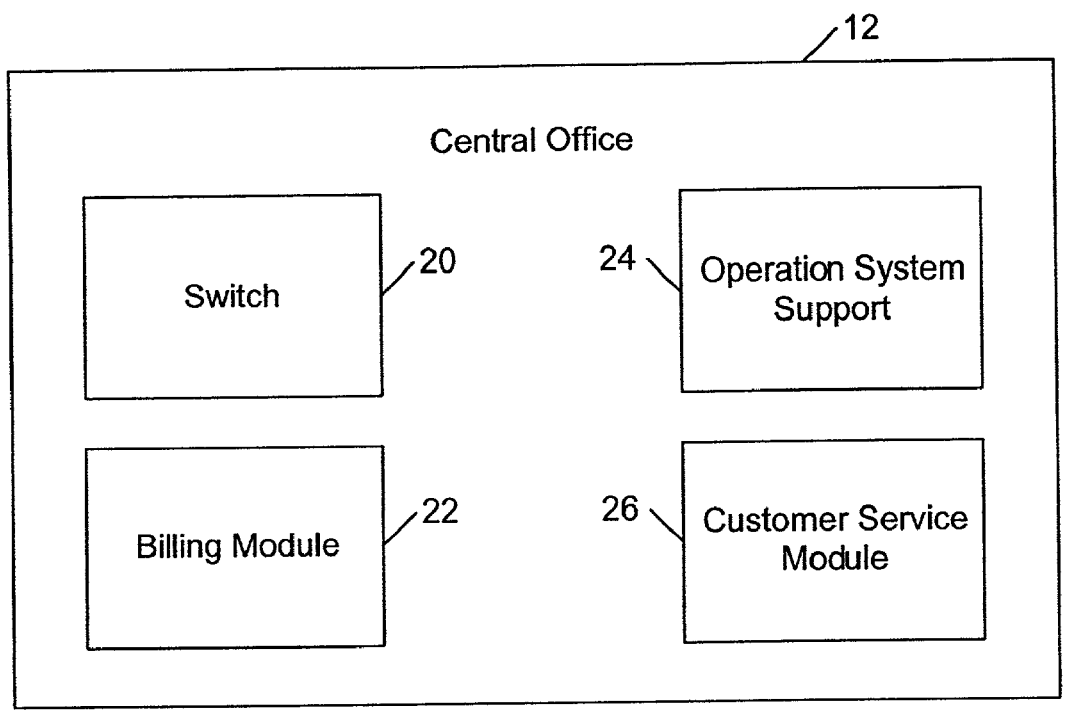
FIG. 2 is a diagram of a typical central office.
Figure 3:
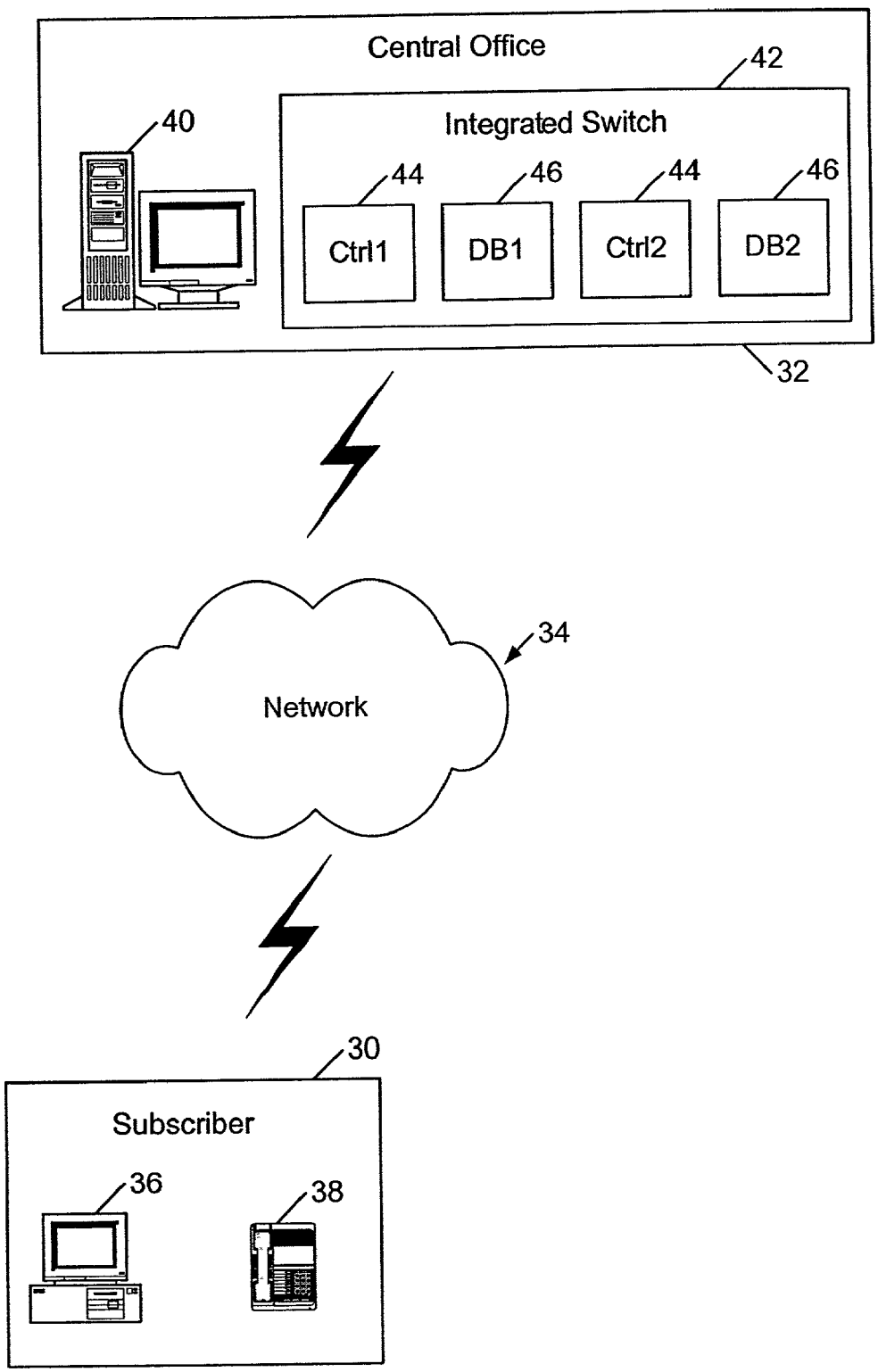
FIG. 3 is a diagram of a system in accordance with one or more embodiments of the present invention.

The present invention involves a method and apparatus for providing an interface to integrated switch control software. Referring to the drawings, wherein like reference characters are used for like parts throughout the several views, FIG. 3 shows an exemplary system in accordance with an embodiment of the present invention.

As can be seen, a subscriber (30) is connected to a central office (32) via a network (34). The subscriber (30) has a computer (36) and a telephone (38) that are provided service by the central office (32). The central office (32) has a computer (40) configured as a network interface, or web server, and an integrated switch (42). The network interface computer (40) may be an Apache server, Microsoft® Windows®-based server, or the like. In one or more embodiments, the integrated switch (42) includes two control blocks (44) and two database blocks (46), which are used to carry out the functionality of the switch (42) and provide redundancy. In addition to handling switch functions, the control blocks (44) and database blocks (46) incorporate the functions of billing module (22), operation system support (24), and customer service module (26).

In situations where redundancy exists, there is an active set of blocks and a passive set of blocks. The active set of blocks receives requests, implements any necessary changes, and generates any necessary responses. Also, the active set of blocks forwards these actions to the passive server. If the passive server does not respond, that status is logged so that the active server can properly synchronize when the passive server comes back on-line.

Figure 4:
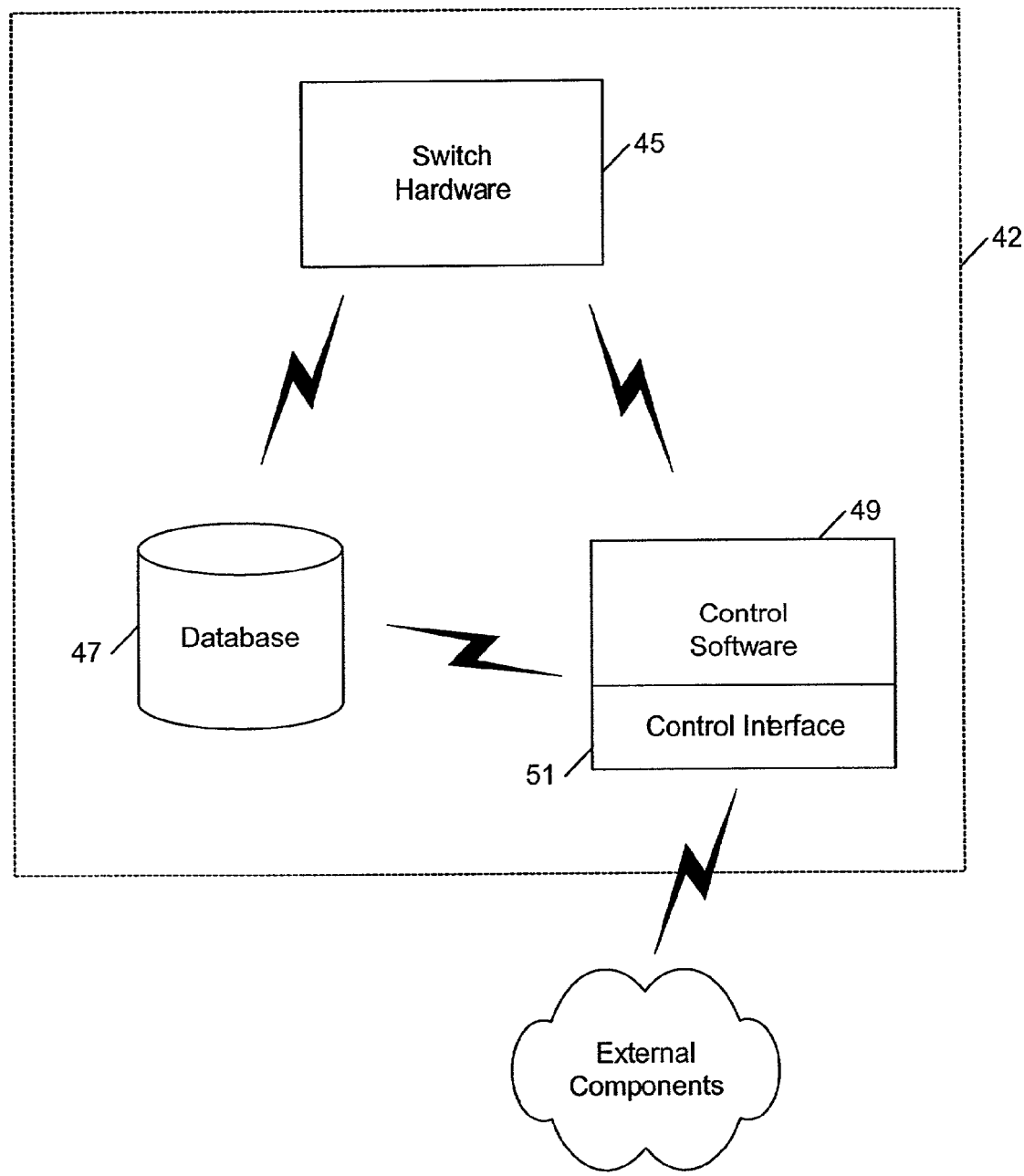
FIG. 4 is a diagram of an integrated switch in accordance with one or more embodiments of the present invention.

Referring to FIG. 4, functionally, the integrated switch (42) is made up of a switch hardware (45), a database (47) for storing all necessary information (port, trunk group, translation table, customer information, rate, billing, web password interfacing, NPA, international, permissions including class V, tandem class IV, etc.), and control software (49) that manages the switch hardware and data stored in the database and interfaces with external components through a control interface (51). By integrating each of the main functional blocks (i.e., the switch (20), billing module (22), operation system support (24), and customer service module (26)) into one integrated switch, communication between the systems is constant and real-time. Changes made to any of the systems are reflected immediately in the others. Further, unnecessary duplication of information is eliminated.

Figure 5:
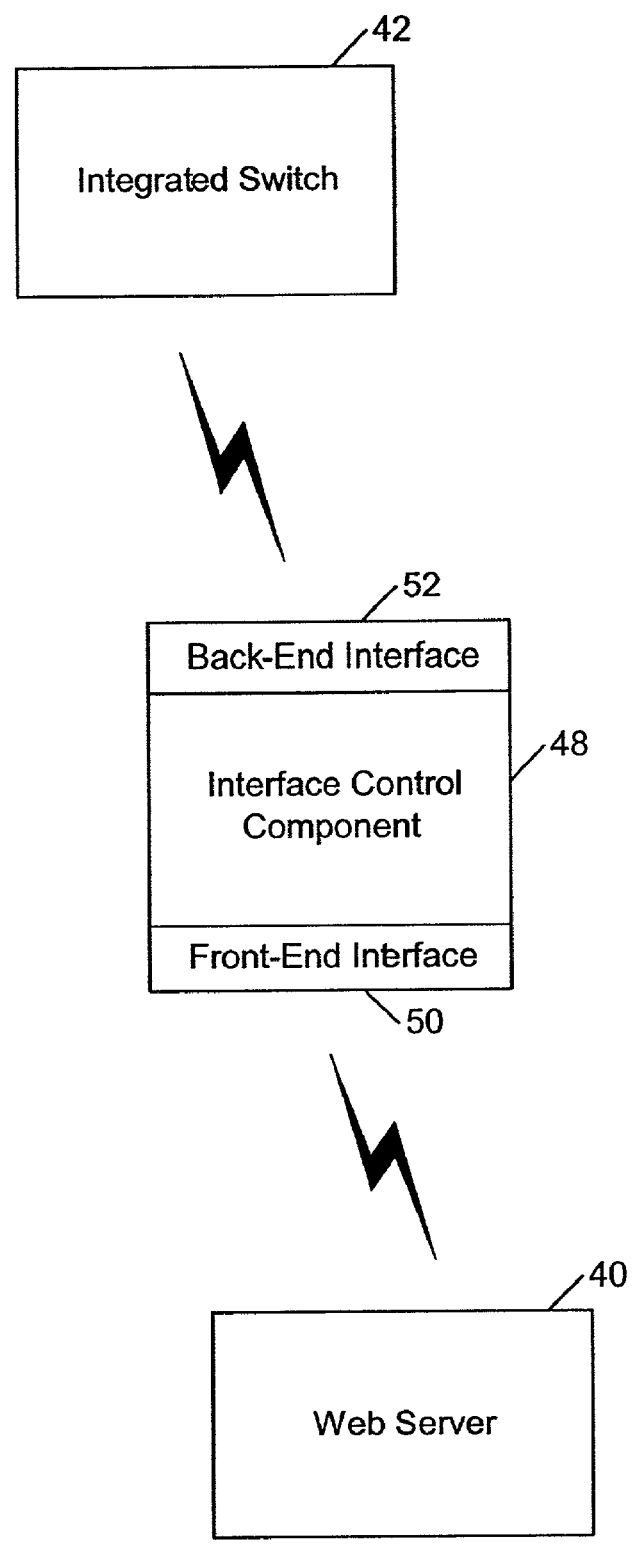
FIG. 5 is a diagram of an interface between an integrated switch and web server in accordance with one or more embodiments of the present invention.

Referring to FIG. 5, the integrated switch (42) is coupled to web server (40) through an interface control component (48). The interface control component (48) includes a front-end interface (50) and a back-end interface (52). The back-end interface (52) communicates with control interface (51) in the integrated switch (42). The front-end interface (50) connects to the web server (40), which hosts web pages available to users via the Internet. Methods of publishing websites on the Internet and connecting thereto are well known in the art and will not be described in detail here.

Figure 6:
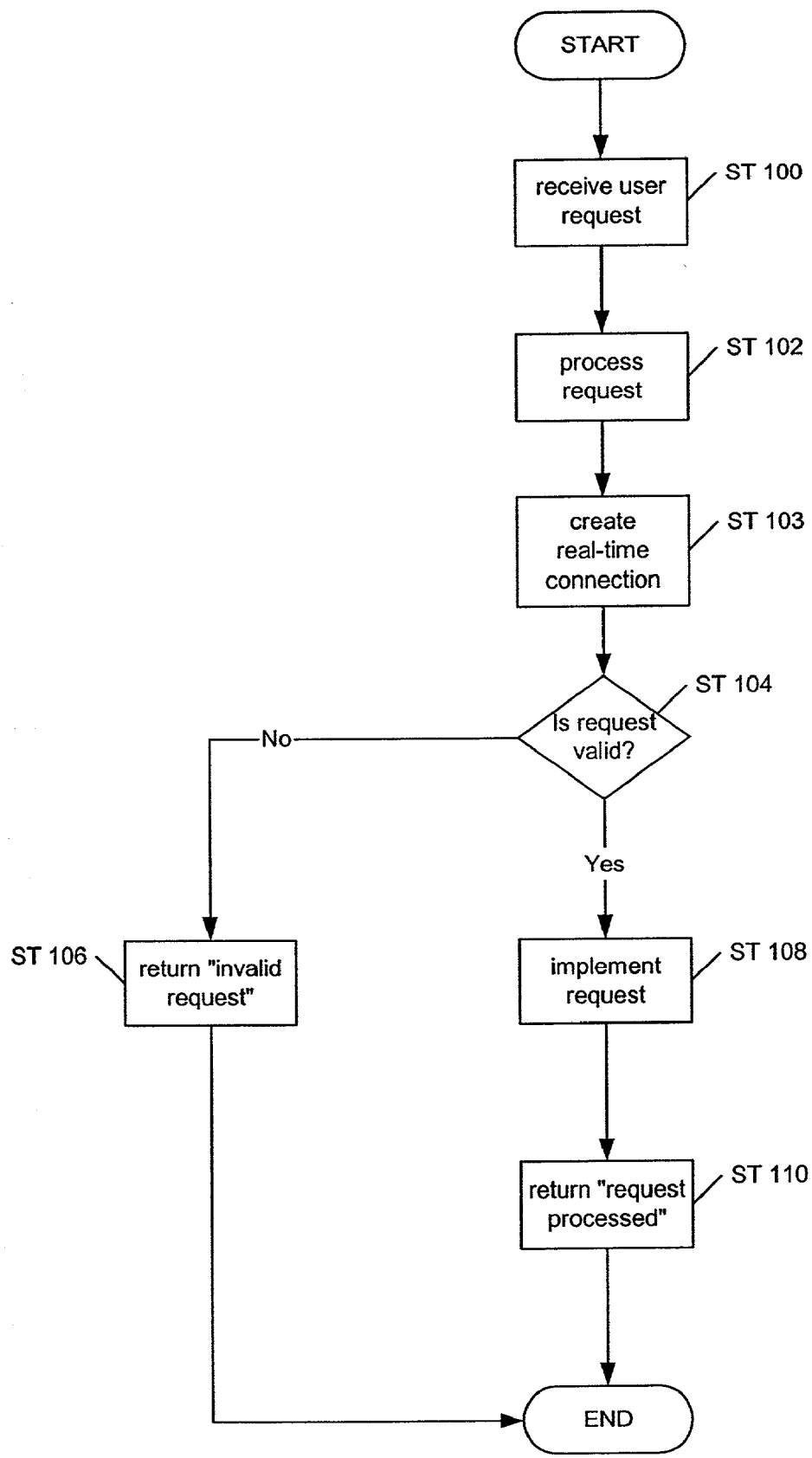
FIG. 6 is a flow chart describing a process in accordance with one or more embodiments of the present invention.

Subscriber options and information are accessible to subscribers via customer interface web pages. Exemplary customer interface web pages are described below. Referring to FIG. 6, a process in accordance with an embodiment of the present invention is shown. When the system receives a user request, e.g., a change to subscriber information or services (step 100), the interface control component (48) processes the request (step 102). Generally, after the request is received at the front-end interface (50), the interface control component determines the type of request received and generates corresponding instructions for communication to the integrated switch (42) from the back-end interface (52).

In accordance with one or more embodiments of the present invention, a subscriber (30) submits a request over the Internet via a web page on web server (40). The web server (40), in response to the user request, evokes CGI (common gateway interface) programs to generate code, e.g., HTML (Hypertext Markup Language), XML (Extensible Markup Language), or the like, that is returned to the user's browser. To establish real-time communication with the integrated switch (42), interface control component (48) implements a UDP (user datagram protocol) interface to the control interface (51), e.g., a UDP interface server, from the CGI run by the web server (40) over IP (internet protocol). Also, the IP address of the user's computer may be logged and associated with the received request.

Once the user request is processed (step 102) and a real-time connection to the integrated switch (42) is created (step 103), the control software (49) determines whether the request is valid (step 104). If the request is invalid (if a service not active is requested to be discontinued, an already active service is requested to be activated, the request is beyond the permission of the user, etc.), the appropriate message indicating that the request is invalid is returned to the user (step 106) through the interface control component (48). Otherwise, upon determining that the request is valid (step 104), the control software (49) determines the appropriate database (47) on the integrated switch (42) with which to communicate. The control software (49) then implements the request (step 108), e.g., the request is packed for the appropriate database and launched to that databases' active servers' queue over a QNX Fleet Network.

Finally, the appropriate message indicating that the request has been implemented is sent to the user (step 110) through interface control component (48). For instance, if the request is a query, the appropriate database responds to the query by sending a return message to the UDP server's queue. The message is read from the queue, associated with the originating IP address of the sender, packaged for reception by the CGI program on the web server, and sent back via the UDP interface. If the request is an add, modify, change, or restricted query, a login name and password is delivered along with the user's IP address by the CGI program. Then, the request is logged as before and a query is launched to the web login database. On a negative permission response for the specific message type, an error message is returned to the CGI program via the UDP interface. On a positive response, the message is packaged and launched as described above.

Figure 7:
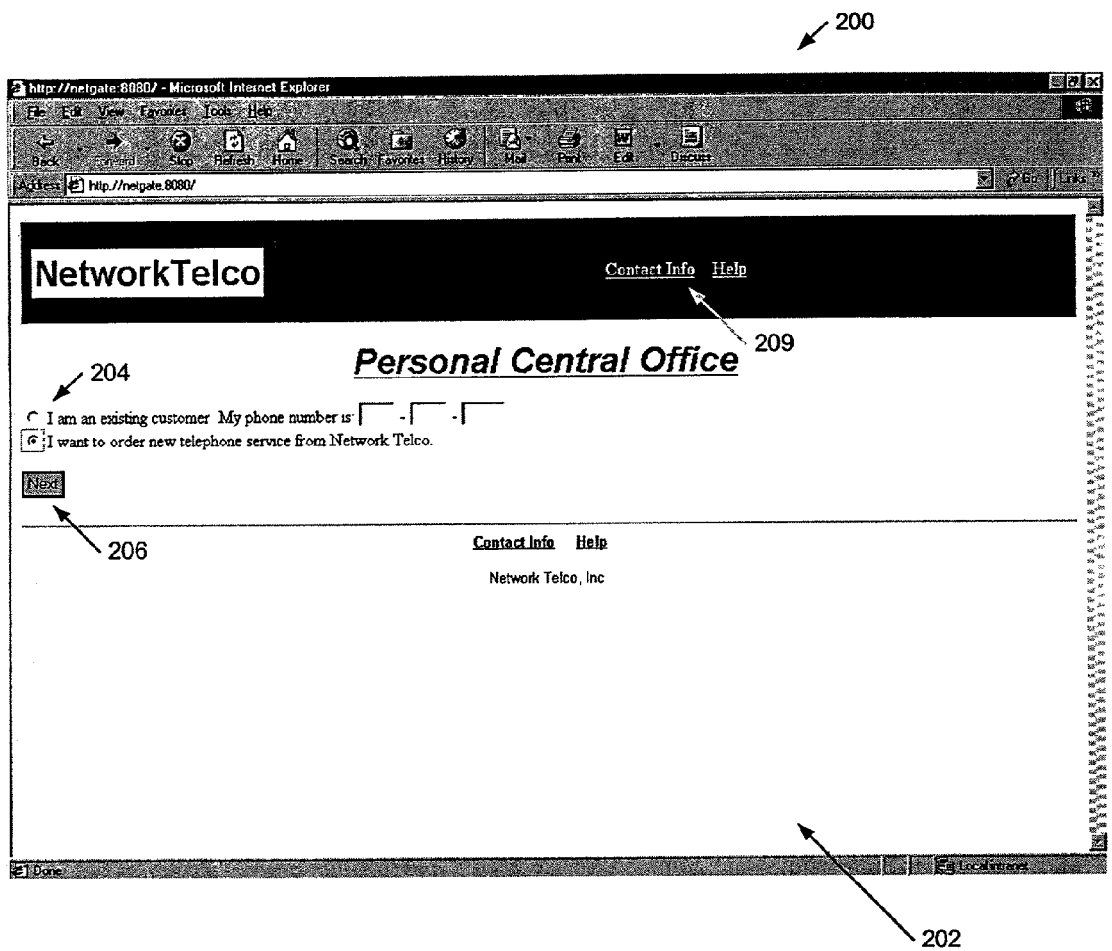
FIG. 7 is a screen shot of an entry page in accordance with one or more embodiments of the present invention.
Figure 8:
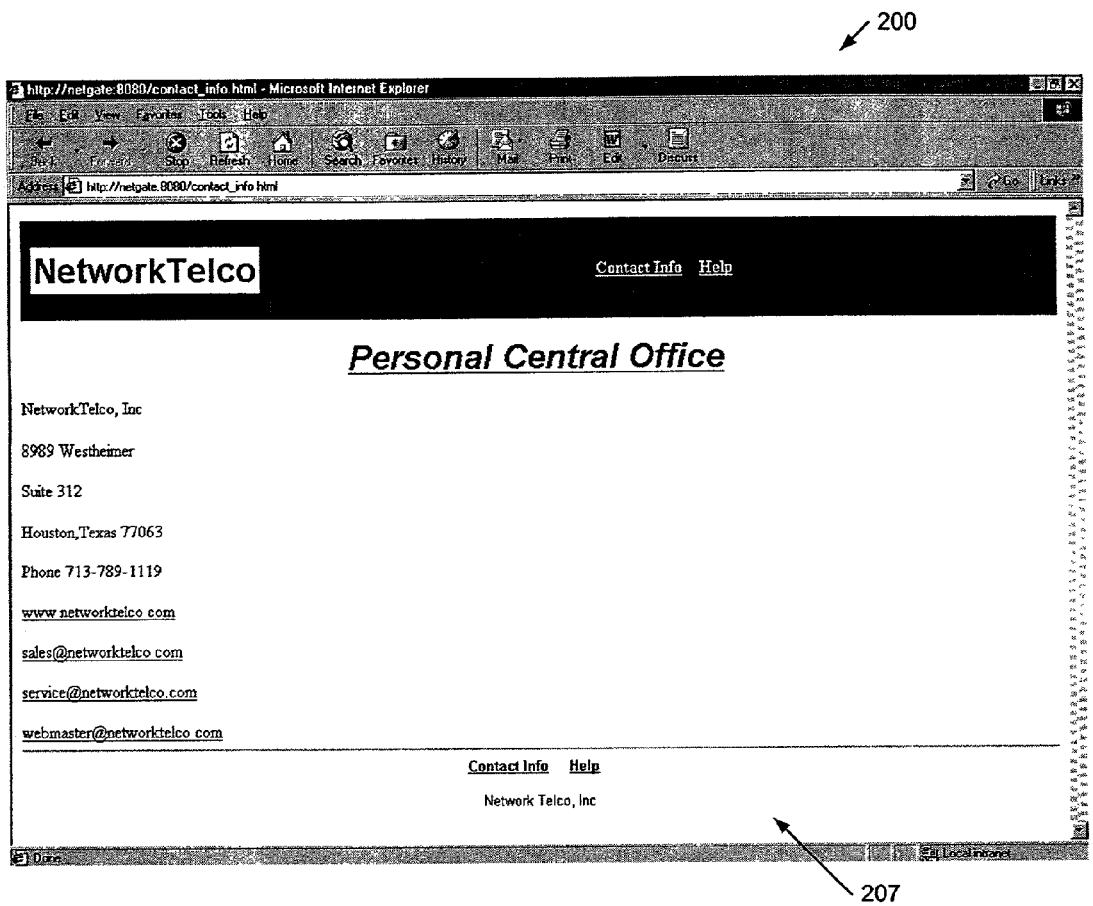
FIG. 8 is a screen shot of a contact information page in accordance with one or more embodiments of the present invention.

Referring to FIGS. 7–22, a series of customer interface web pages hosted by web server (40) for communication with the integrated switch (42) through interface control component (48) are shown. When a user reaches the customer interface website hosted on web server (40), the user's browser (200) displays the entry page (202). Referring to FIG. 7, on the entry page (202), there are radio buttons (204) for identifying whether the user is an existing customer or wants to request new service. After making a selection, the user submits the information by choosing the "next" button (206). Alternatively, the user can reach a contact information page (207), shown in FIG. 8, through the "contact info" link (209).

Figure 9:
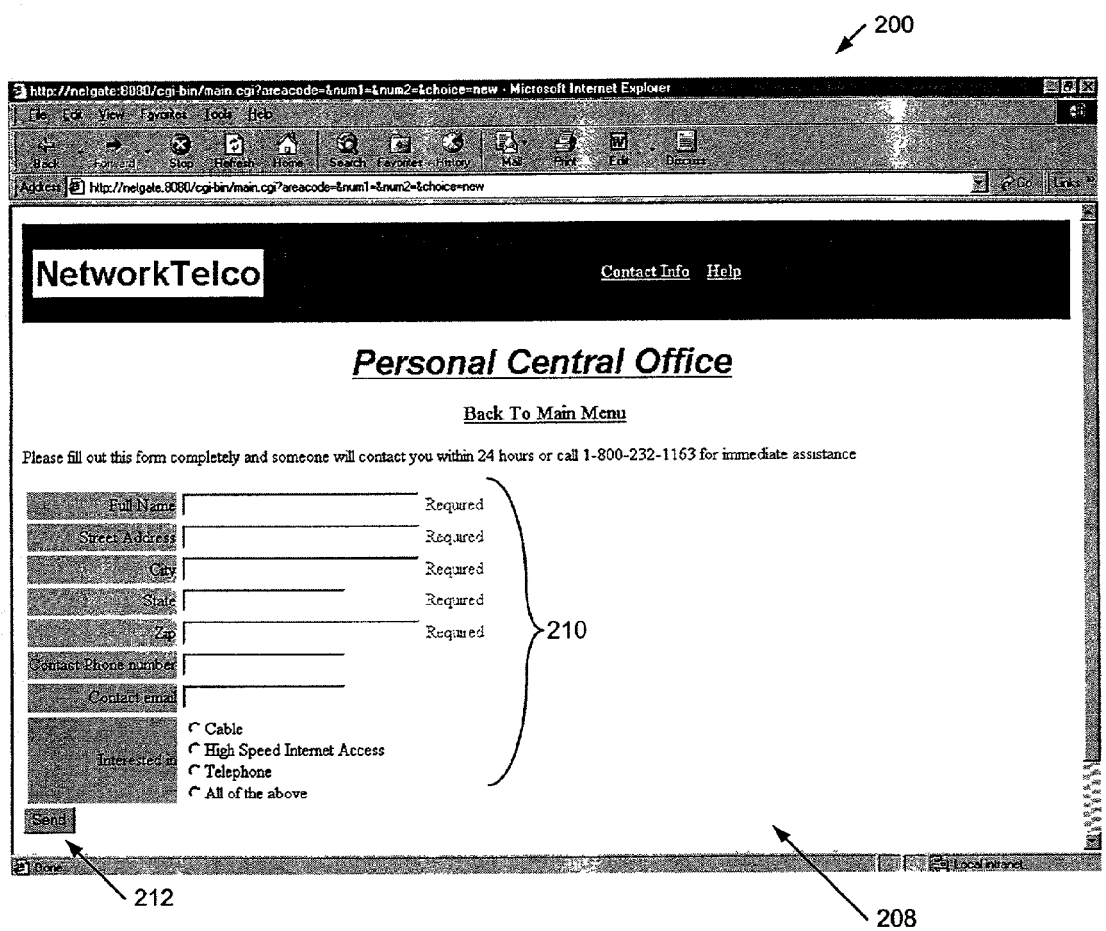
FIG. 9 is a screen shot of a subscriber information page in accordance with one or more embodiments of the present invention.

If the user selects the radio button (204) indicating that new service is desired, a subscriber information page (208), as can be seen in FIG. 9, is displayed in the user's browser (200). The subscriber information page (208) includes fields (210) for entering the user's name, contact information, and type of service that interests the user. Once the fields (210), or at least the minimum required fields, are filled out, the user can submit the information by choosing the "send" button (212).

Figure 10:
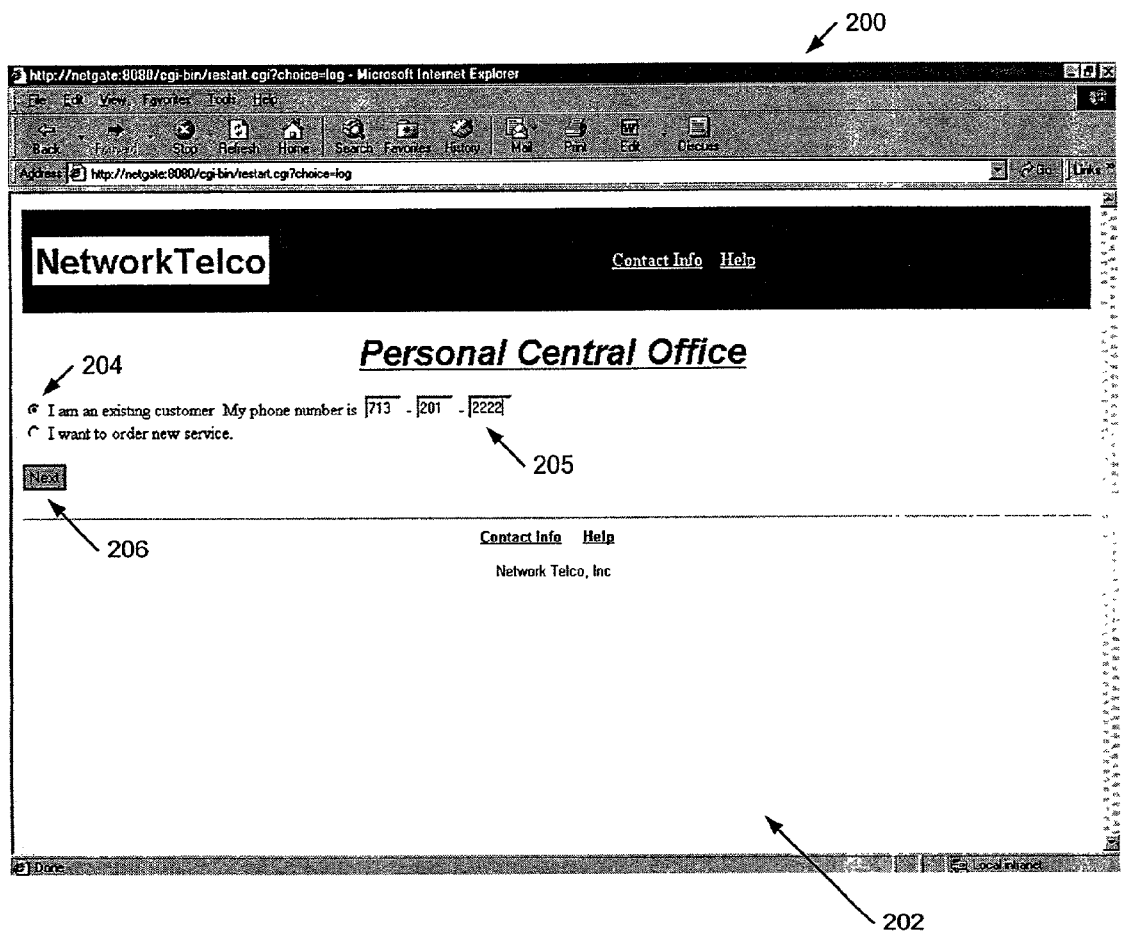
FIG. 10 is a screen shot of an entry page in accordance with one or more embodiments of the present invention.
Figure 11:
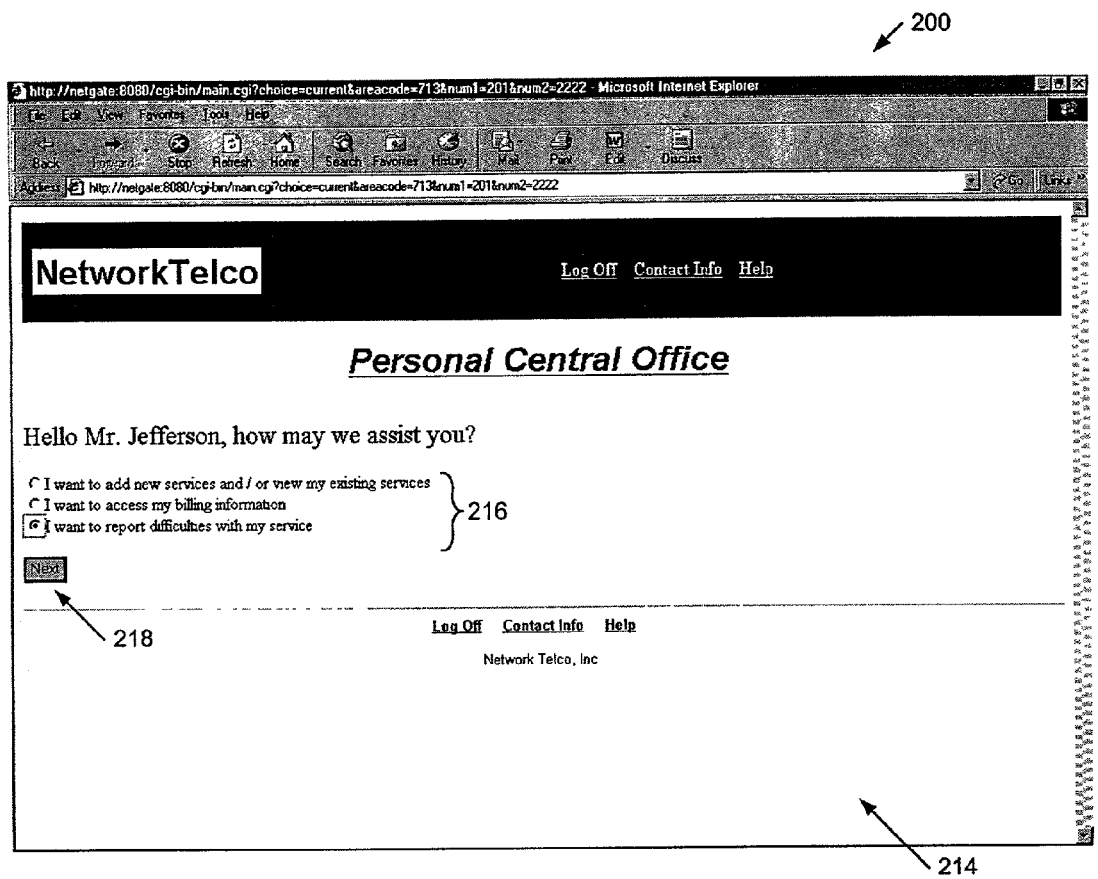
FIG. 11 is a screen shot of a service option page in accordance with one or more embodiments of the present invention.

Referring to FIG. 10, if the user selects the radio button (204) indicating that service exists, the user's unique subscriber identification number, e.g., the user's telephone number, must be entered into field (205). When the user's unique identification number is submitted by choosing the "next" button (206), the system queries the subscriber information database to determine if the user is recognized. If the user is unrecognized, an error message will be returned. Otherwise, a service option page (214) is displayed in the user's browser (200). As shown in FIG. 11, the service option page (214) has radio buttons (216) for selecting types of service options available to the user. Upon selecting a service option using radio buttons (216), the user submits the selection using "next" button (218).

Figure 12:
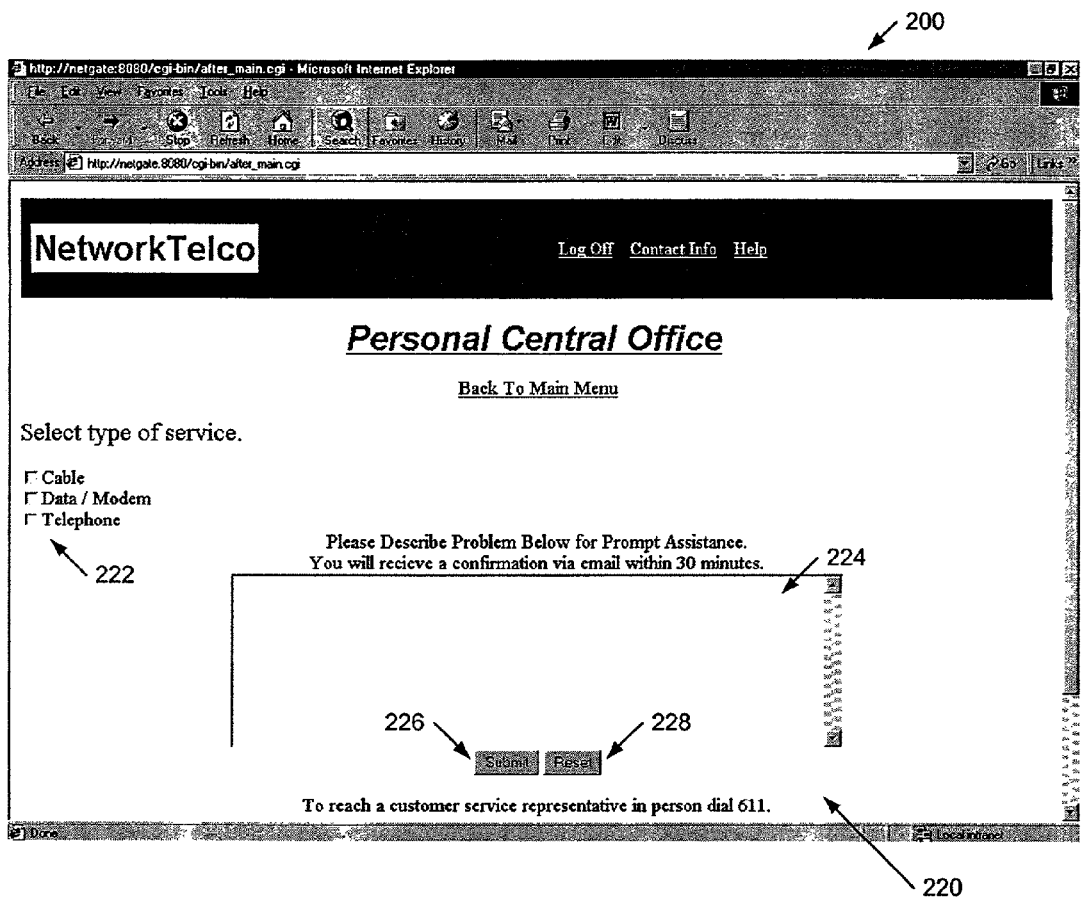
FIG. 12 is a screen shot of a difficulty report page in accordance with one or more embodiments of the present invention.

When the user selects radio button (216) indicating that difficulties are being experienced with service, a difficulty report page is displayed in the user's browser (200). As shown in FIG. 12, the difficulty report page (220) has check boxes (222) for indicating the type of service experiencing difficulty and a text box (224) for describing the particular problems being experienced. Once the user fills in the appropriate boxes, the information can be submitted to the system using "submit" button (226) or reset using "reset" button (228).

Figure 13:
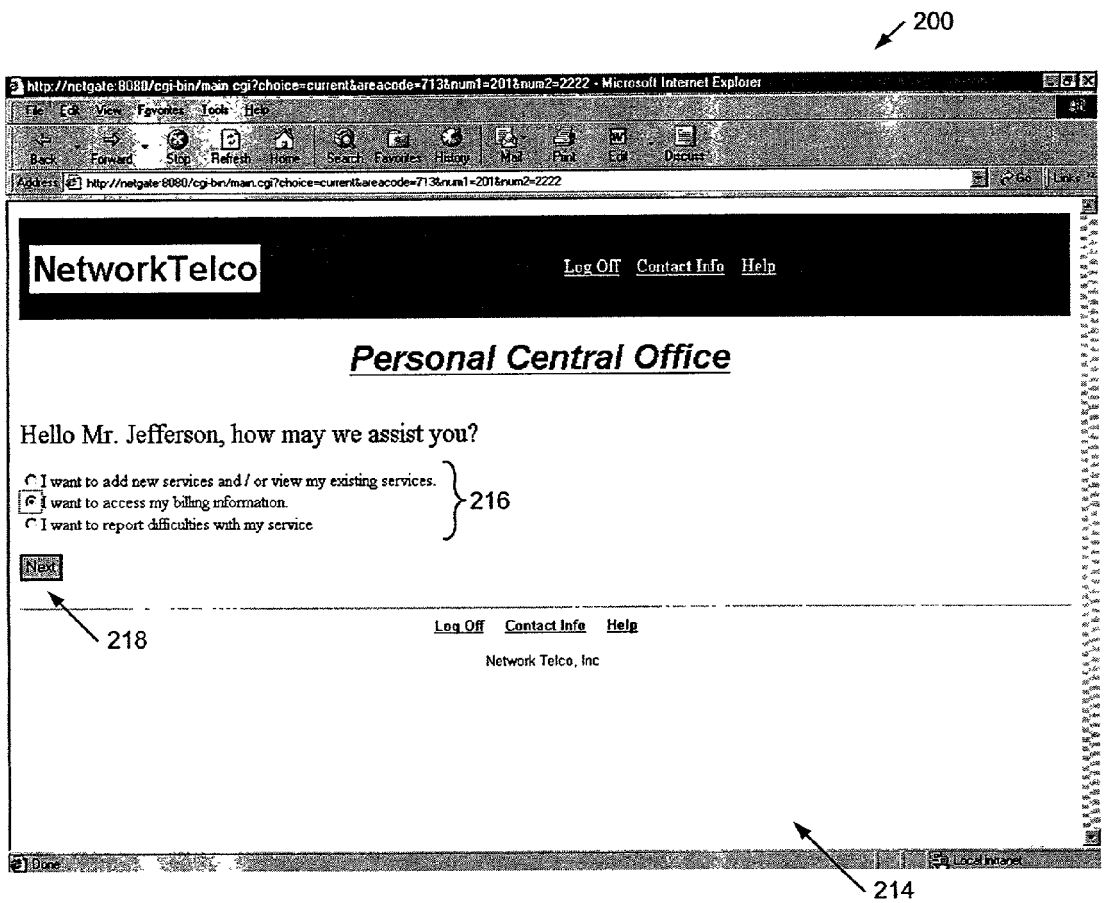
FIG. 13 is a screen shot of a service option page in accordance with one or more embodiments of the present invention.
Figure 14:
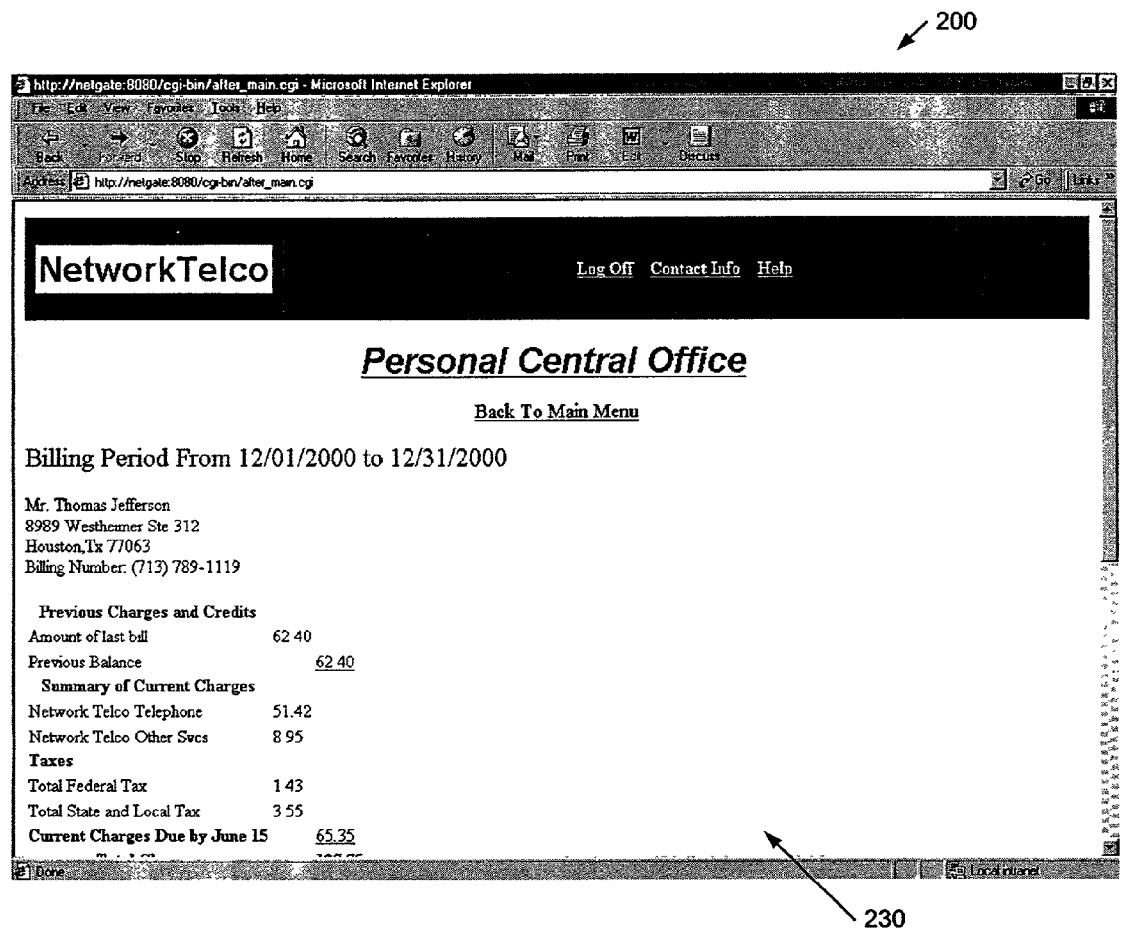
FIG. 14 is a screen shot of a billing information page in accordance with one or more embodiments of the present invention.

Referring to FIGS. 13–14, when a user chooses to access billing information using radio buttons (216), a billing information page (230) is displayed in the user's browser (200). The billing information page (230) includes the subscriber's billing address together with the charges for the current billing period. Further billing information, i.e., past billings, billing breakdowns, etc., may also be selectively shown.

Figure 15:
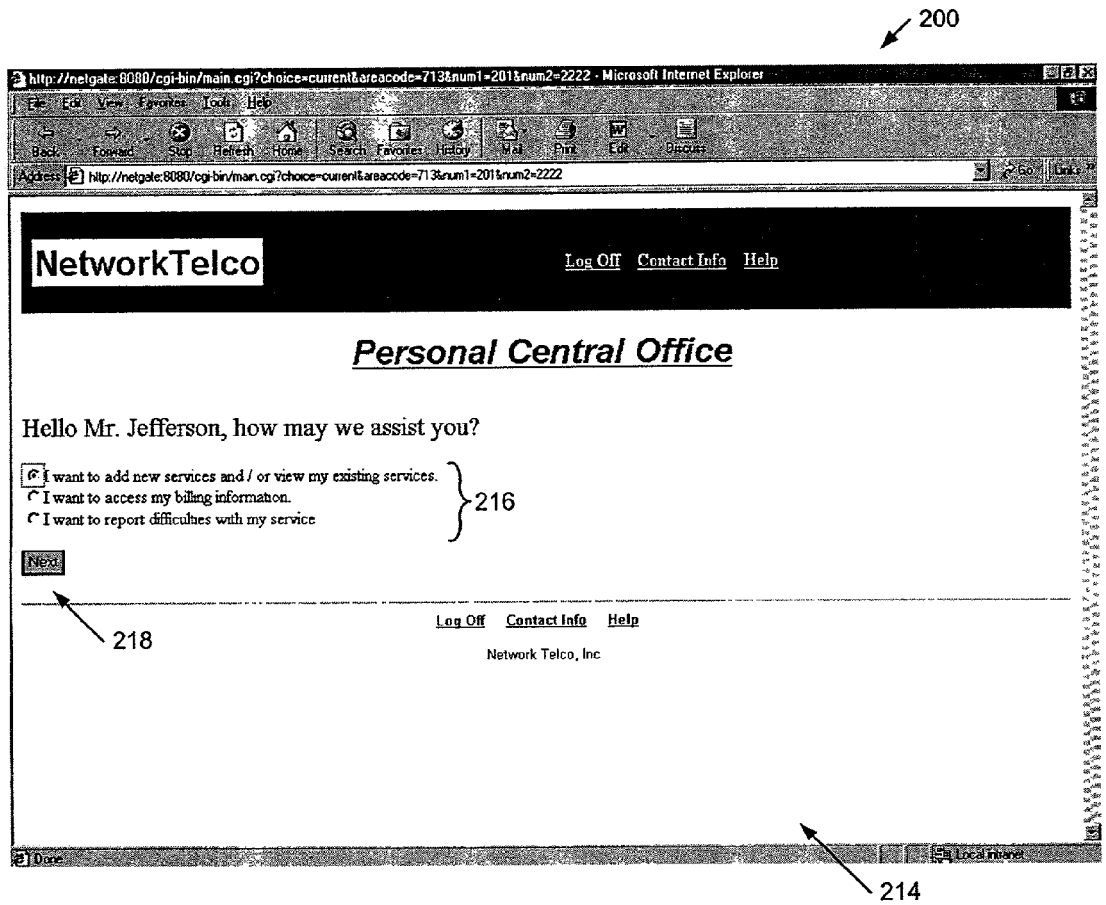
FIG. 15 is a screen shot of a service option page in accordance with one or more embodiments of the present invention.
Figure 16:
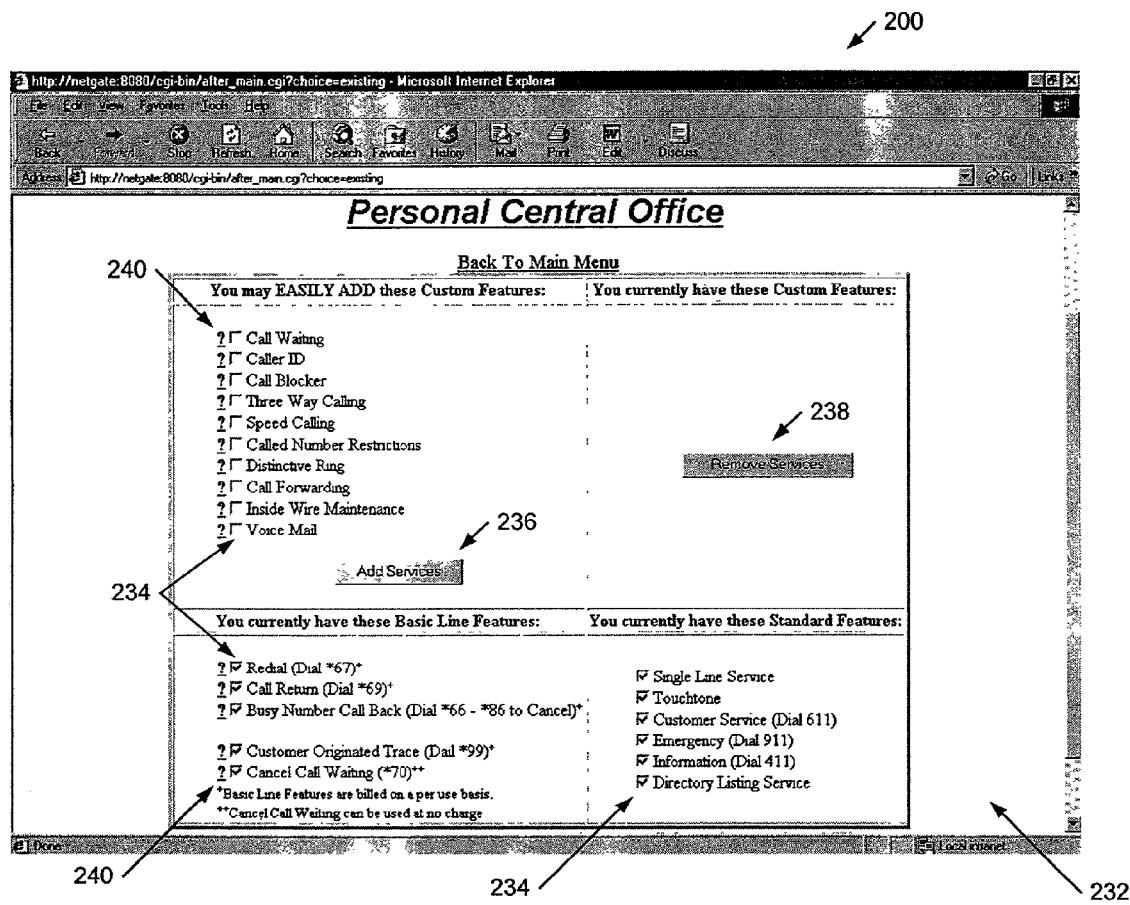
FIG. 16 is a screen shot of a feature selection page in accordance with one or more embodiments of the present invention.
Figure 17:
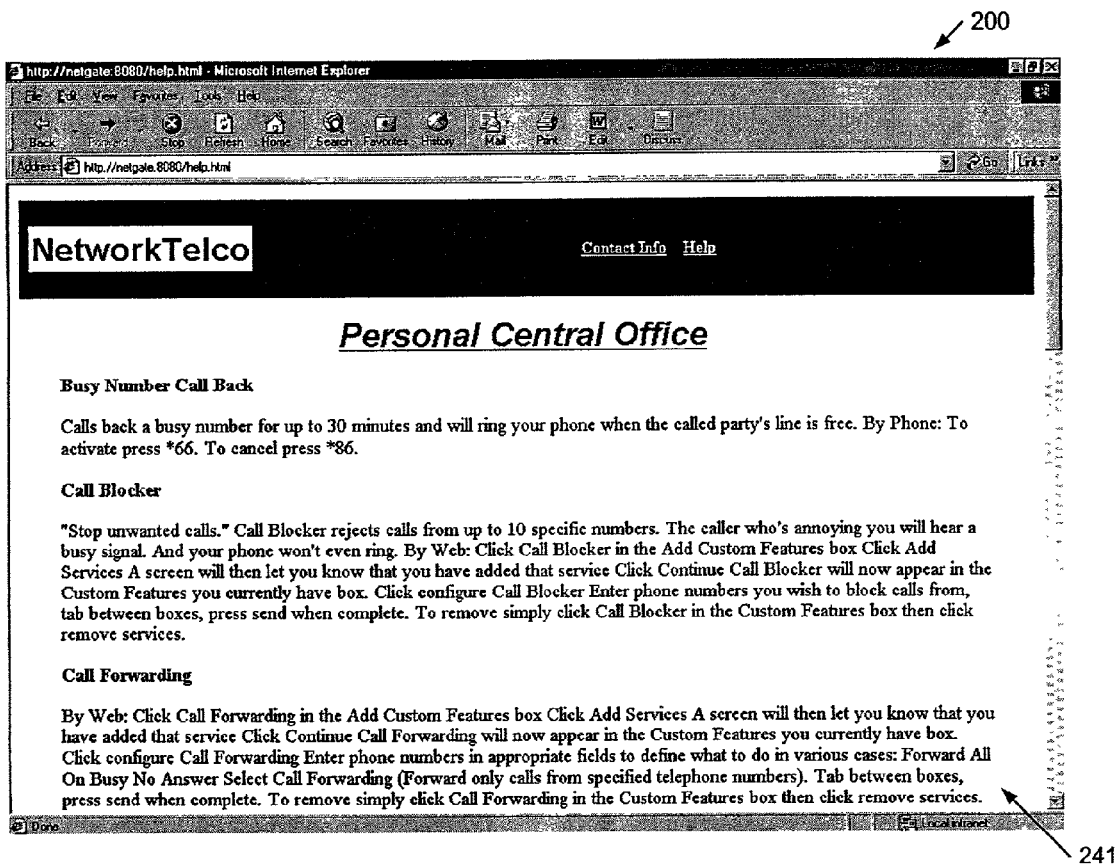
FIG. 17 is a screen shot of a help page in accordance with one or more embodiments of the present invention.

Referring to FIGS. 15–16, when a user selects the radio button (216) for changing existing services, a feature selection page (232) is displayed in the user's browser (200). The feature selection page (232) has a plurality of check boxes (234) which can be used to toggle active features. Also, a plurality of help links (240) are included that lead to a help page (241), as shown in FIG. 17, that displays further information for certain features.

The features are divided into three groups: basic line features, standard features, and custom features. Basic line features include redial, call return, busy number call back, customer originated trace, and cancellation of call waiting. Standard Features include single line service, touchtone, customer service, emergency, information, and directory listing service. These features may be toggled by selecting the appropriate check box (234) next to the service. Custom features include call waiting, caller ID, call blocker, three-way calling, called number restrictions, distinctive ring, call forwarding, inside wire maintenance, and voice mail. These services also have check boxes (234), but upon selecting a custom feature, the user must submit the selection using "add services" button (236).

Figure 18:
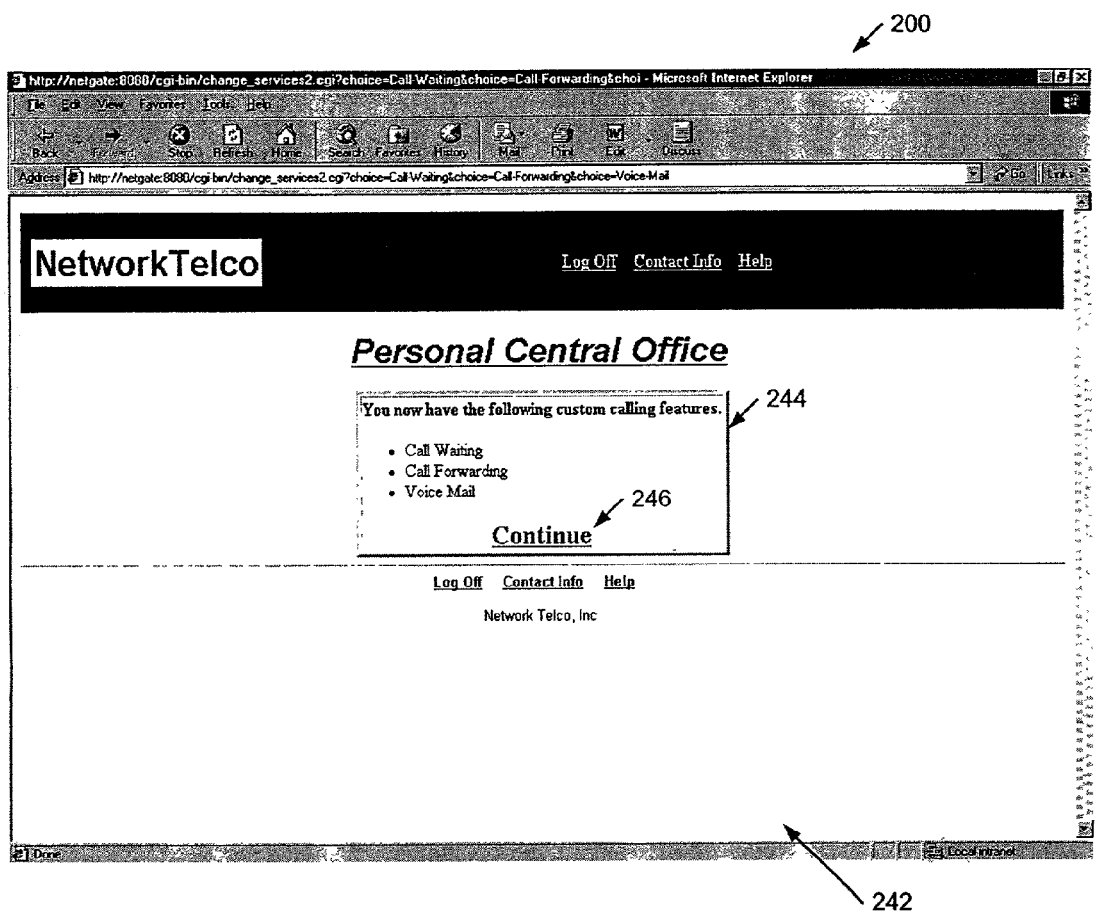
FIG. 18 is a screen shot of a result page in accordance with one or more embodiments of the present invention.

When a user chooses the "add services" button (236), the system implements the selected features as described above and returns a message indicating that the new service features have been implemented. For example, if a user selected the check boxes (234) for call waiting, call forwarding, and voice mail, and chose the "add services" button (236), the result page (242) shown in FIG. 18 is displayed in the user's browser (200). The result page (242) shows details (244) of the new features added to the user's service and provides a link (246) for returning to the feature selection page (232).

Figure 19:
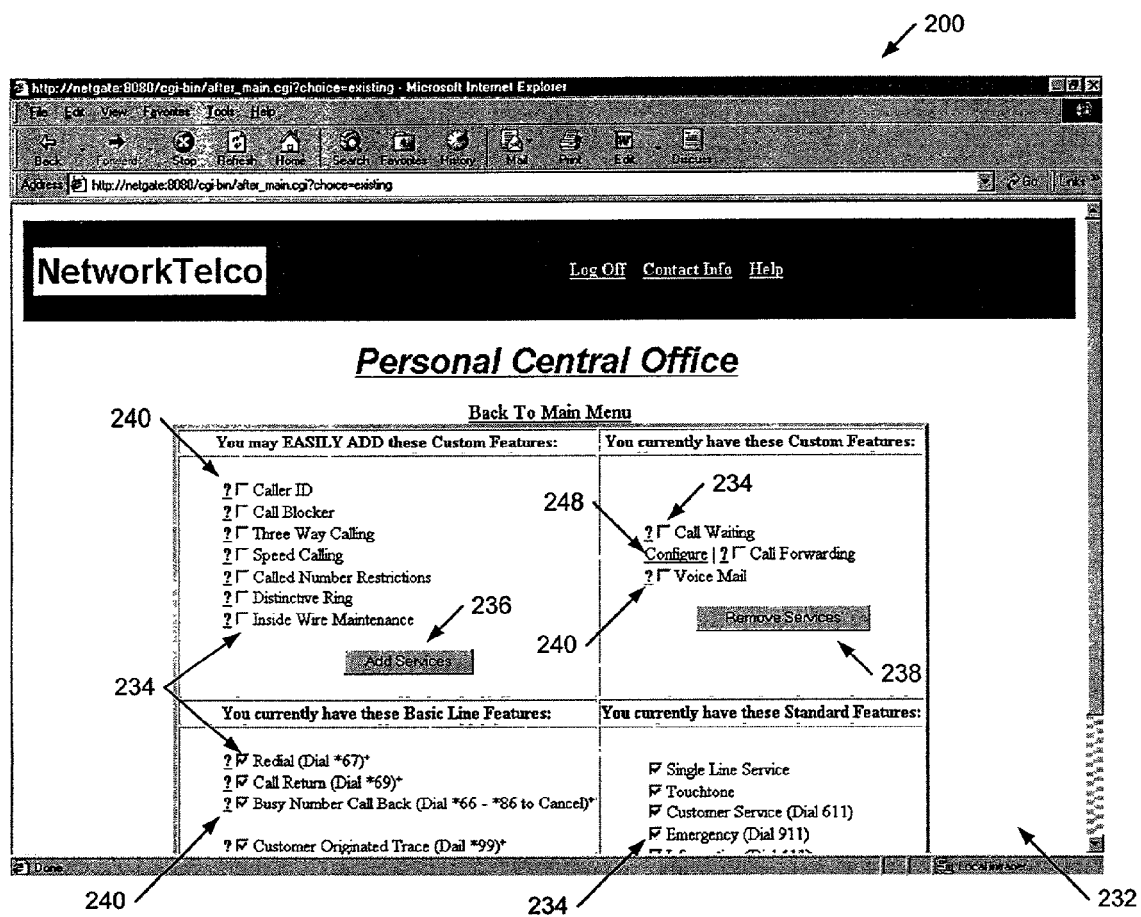
FIG. 19 is a screen shot of a feature selection page in accordance with one or more embodiments of the present invention.

Referring to FIG. 19, in the example presented above, when the user returns to feature selection page (232) through link (246), the newly added custom features appear as services that can be removed. To remove the active custom features, the user selects the associated check box (234) and chooses the "remove services" button (238). Also, appearing with the active custom features is a link (248) to configuration options for configurable active custom features. In the example shown, call forwarding is a configurable active custom feature and, accordingly, a link (248) to configuration options is displayed in the user's browser (200).

Figure 20:
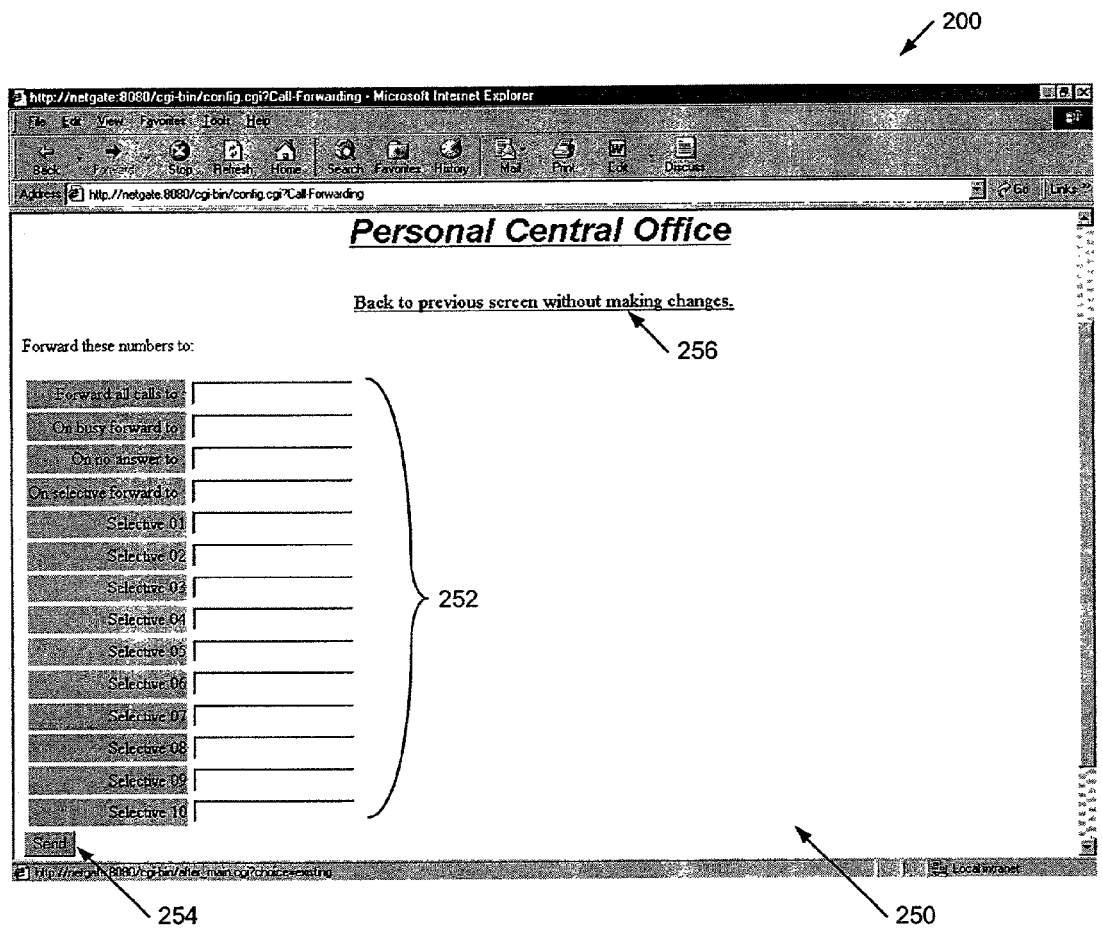
FIG. 20 is a screen shot of a call forwarding configuration page in accordance with one or more embodiments of the present invention.
Figure 21:
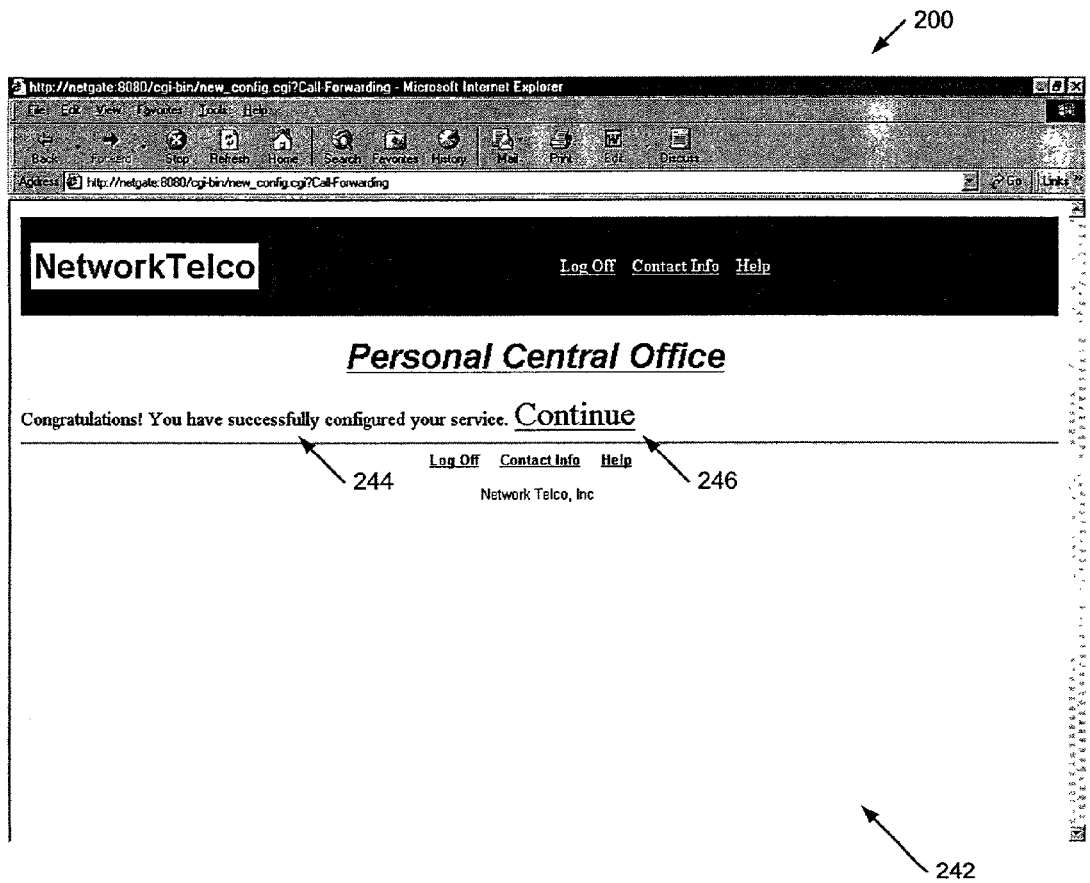
FIG. 21 is a screen shot of a result page in accordance with one or more embodiments of the present invention.

When a user selects the link (248) associated with the call forwarding feature, a call forwarding configuration page (250) as shown in FIG. 20 is displayed in the user's browser (200). The call forwarding configuration page (250) includes fields (252) for entering telephone numbers that calls should be forwarded to in various cases. Once the desired fields are filled in, the user can effect the changes by submitting the information via "send" button (254). Otherwise, the user can return without making any changes using provided link (256). When the information is submitted via "send button" (254), the system implements the changes and returns a result page (242) as shown in FIG. 21 to the user's browser (200). The result page (242) shows details (244) that the changes have been implemented and provides a link (246) for returning to the feature selection page (232).

Advantages of the present invention may include one or more of the following. The system integrates all of the main aspects of a telephone service provider into a single product and allows the subscriber to change service options via a customer interface in real-time. All customer requests are active within milliseconds and information is accurately stored throughout the integrated switch. All databases function in real-time and are fully redundant with no single point of failure. Data on the integrated switch can be reported or acted on via the interface control component while still shielding the switch from alien entry.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An interface to integrated switch control software comprising:
    a front-end interface coupled to a network;
    a back-end interface coupled to the integrated switch control software; and
    an interface control component internosed between the front-end interface and the back-end interface that manages implementing requests from the network with the integrated switch control software,
    wherein the interface control component is further configured to receive a request at the front-end interface and directly communicate the request to the integrated switch control software via the back-end interface.

2. The interface of claim 1, wherein the interface control component further translates the requests from the network into instructions understandable by the integrated switch control software.

3. The interface of claim 1, wherein the integrated switch control software manages:
    the switch; and
    a database.

4. The interface of claim 1, wherein the integrated switch control software manages:
    the switch;
    a billing module;
    an operation system support module; and
    a customer service module.

5. The interface of claim 1, wherein the integrated switch control software comprises:
    primary control software for managing a switch during normal operation; and
    secondary control software that provides redundancy during normal operation and manages the switch when the primary control software is not functioning.

6. The interface of claim 1, wherein the interface allows real-time communication to occur between the network and the integrated switch software.

7. The interface of claim 1, wherein the network is the Internet.

8. A system for interfacing to integrated switch control software comprising:
    an integrated switch comprising integrated switch control software; and
    a control interface coupled to the integrated switch for providing access from a network to the integrated switch control software,
    wherein the control interface is configured to receive requests from a back-end interface of an integrated control component.

9. The system of claim 8, further comprising: a network interface coupled to the control interface for providing access to the network.

10. The system of claim 9, wherein the control interface comprises:
    a front-end interface that connects to the network interface; and
    a back-end interface that connects to the integrated switch.

11. The system of claim 8, wherein the control interface provides real-time communication from the network to the integrated switch control software.

12. The system of claim 8, wherein the network is the Internet.

13. The system of claim 8, the integrated switch further comprising:
    secondary control software for providing redundancy during normal operations and managing the integrated switch when the integrated switch control software is not functioning.

14. The system of claim 8, the integrated switch further comprising:
    a billing module;
    an operation system support module; and
    a customer service module.

15. The system of claim 14, wherein changes can be made to the billing module, operation system support module, and customer service module from the network.

16. The system of claim 14, wherein the billing module, the operation system support module, and customer service module use a common database.

17. A method of interfacing an interface control component to integrated switch control software comprising:
    coupling a front-end interface to a network;
    coupling a back-end interface to integrated switch control software; and
    managing the implementation of requests from the network with the integrated switch control software,
    wherein the interface control component is interposed between the front-end interface and the back-end interface, and
    wherein the interface control component is further configured to receive said requests at the front-end interface and directly communicate said requests to the integrated switch control software via the back-end interface.

18. The method of claim 17 comprising:
    translating requests from the network into instructions understandable to the integrated switch control software.

19. The method of claim 17 further comprising:
    managing a switch and a database from the network.

20. The method of claim 17 further comprising:
managing a billing module, an operation system support module, and a customer service module from the network.

21. The method of claim 17 further comprising:
synchronizing a primary control software that manages normal operations with a secondary control software that provides redundancy during normal operations and manages operations when the primary control software is not functioning.

22. An apparatus for interfacing an interface control component to integrated switch control software comprising:
means for coupling a front-end interface to a network;
means for coupling a back-end interface to integrated switch control software; and
means for managing the implementation of requests from the network with the integrated switch control software,
wherein the interface control component is interposed between the front-end interface and the back-end interface, and
wherein the interface control component is further configured to receive said requests at the front-end interface and directly communicate said requests to the integrated switch control software via the back-end interface.

23. The apparatus of claim 22 comprising:
means for translating requests from the network into instructions understandable to the integrated switch control software.

24. The apparatus of claim 22 further comprising:
means for managing a switch and a database from the network.

25. The apparatus of claim 22 further comprising:
means for managing a billing module, an operation system support module, and a customer service module from the network.

26. The apparatus of claim 22 further comprising:
means for synchronizing a primary control software that manages normal operations with a secondary control software that provides redundancy during normal operations and manages operations when the primary control software is not functioning.

27. A telecommunications central office comprising:
an integrated switch comprising integrated switch control software;
a network interface for coupling to a network; and
an interface control component comprising a front-end interface coupled to the network and a back-end interface coupled to the integrated switch control software for connecting the integrated switch and the network interface to allow requests received at the front-end interface from the network to be communicated directly to the integrated switch control software via the back-end interface.

28. The telecommunications central office of claim 27, wherein the integrated switch further comprises:
a billing module, an operation system support module, and a customer service module.

29. The telecommunications central office of claim 27, wherein the network interface is a web server.

30. The telecommunications central office of claim 27, wherein the interface control component comprises:
a front-end interface for coupling to the network interface; and a back-end interface for coupling to the integrated switch.

31. A telecommunications central office comprising:
a switch;
a billing module;
an operation system support module;
a customer service module;
control software for managing the switch, the billing module, the operation system support module, and the customer service module;
a network interface for coupling to a network; and
an interface control component interposed between a front-end interface for coupling to the network interface and a back-end interface for coupling to the control software, wherein the interface control component allows requests from the network received at the front-end interface to be implemented with the control software and communicated directly to the control software via the back-end interface.

32. The telecommunications central office of claim 31 wherein the requests from the network are implemented in real-time with the control software.

* * * * *